Nov. 9, 1965  R. G. HEINCELMAN  3,216,763
LATCH MECHANISM FOR CONVERTIBLE AUTOMOTIVE VEHICLE
Filed March 13, 1963  2 Sheets-Sheet 1

INVENTOR.
Raymond G. Heincelman
BY
E. E. James
ATTORNEY

Nov. 9, 1965    R. G. HEINCELMAN    3,216,763
LATCH MECHANISM FOR CONVERTIBLE AUTOMOTIVE VEHICLE
Filed March 13, 1963    2 Sheets-Sheet 2

INVENTOR.
Raymond G. Heincelman
BY
E. E. James
ATTORNEY

United States Patent Office 3,216,763
Patented Nov. 9, 1965

3,216,763
LATCH MECHANISM FOR CONVERTIBLE
AUTOMOTIVE VEHICLE
Raymond G. Heincelman, Bloomfield Hills, Mich., assignor to General Motors Corporation, Detroit, Mich., a corporation of Delaware
Filed Mar. 13, 1963, Ser. No. 264,867
15 Claims. (Cl. 296—121)

This invention relates generally to latch mechanisms and more particularly to a latch mechanism adapted to lock the supporting frame of a foldable convertible top in weather sealing engagement with a windshield supporting member to enclose the passenger compartment of a convertible automotive vehicle.

In convertible automobiles, cooperating top latching means have been generally mounted laterally of the windshield header and of the mating top supporting front rail or header to permit manual latching and unlatching operation by an occupant within the vehicle. In the limited space available under the top supporting rail, such mechanisms have been somewhat difficult to align and operate and have often been incapable of providing the leverage and clamping forces necessary to seal the top supporting rail properly with respect to the windshield header. The protruding elements of such top latching mechanisms also present substantial head injury hazards to occupants under rapid vehicle braking and collision impact conditions.

In its broader aspects, the invention contemplates an improved convertible header latch mechanism mounted substantially within the side rail and immediately adjacent the front rail of a convertible top supporting frame. In an illustrative embodiment hereinafter shown and described, a side rail supported bracket pivotally mounts a latch operating lever swingable between a latch disengaging position projecting laterally of the side rail member and a latch engaging position retracted within the confines of its mounting side rail. The operating lever is operably connected to swing a latch supporting lever between corresponding latch disengaging and engaging positions. A keeper engageable latch member is pivotally mounted on and swingable with the supporting lever between a retracted keeper disengaging position and a position initiating and effecting latching engagement with a striker or keeper mounted on the front windshield supporting pillar member by appropriate actuating movement of the operating lever. The operative connection between the latch supporting and operating levers is preferably such that the weatherseal clamping forces applied between the windshield header and front top rail by the effected latching are transmitted to and act overcenter of the pivotal mounting of the operating lever to resiliently and effectively lock this lever in its retracted position. The bracket of the illustrative latch mechanism structurally reinforces the juncture of the top supporting frame between the front and side rail members.

The substantially concealed location of the latch mechanism provides maximum accessibility of the latch operating lever under the closed convertible top and permits the use of such a lever having substantial length. Such lever accessibility and length cooperate with the mechanical advantage obtainable from the side rail concealed operating linkage to reduce the required latch operating effort and to provide sufficient operational leverage to insure latching of the top supporting rail in proper sealing engagement with the windshield header. Under normal top latching conditions, the retracted position of the operating lever precludes possible injury to the vehicle occupants by the latch mechanism. In either its extended or retracted positions, the operating lever provides a substantial visual reference as to the operative position of the latch mechanism. Such an obvious visual reference tends to preclude operation of the vehicle with the top closed but in an unlocked condition.

The foregoing and other objects, advantages and features of the invention will be apparent from the following description of the preferred illustrative embodiment, having reference to the accompanying drawings, in which.

Figure 5:
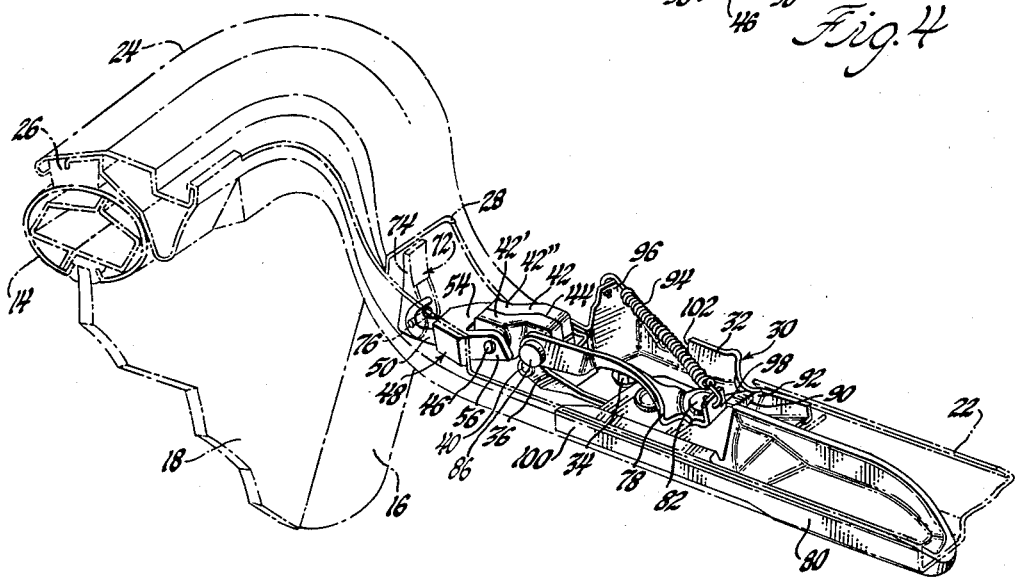
Figure 6:
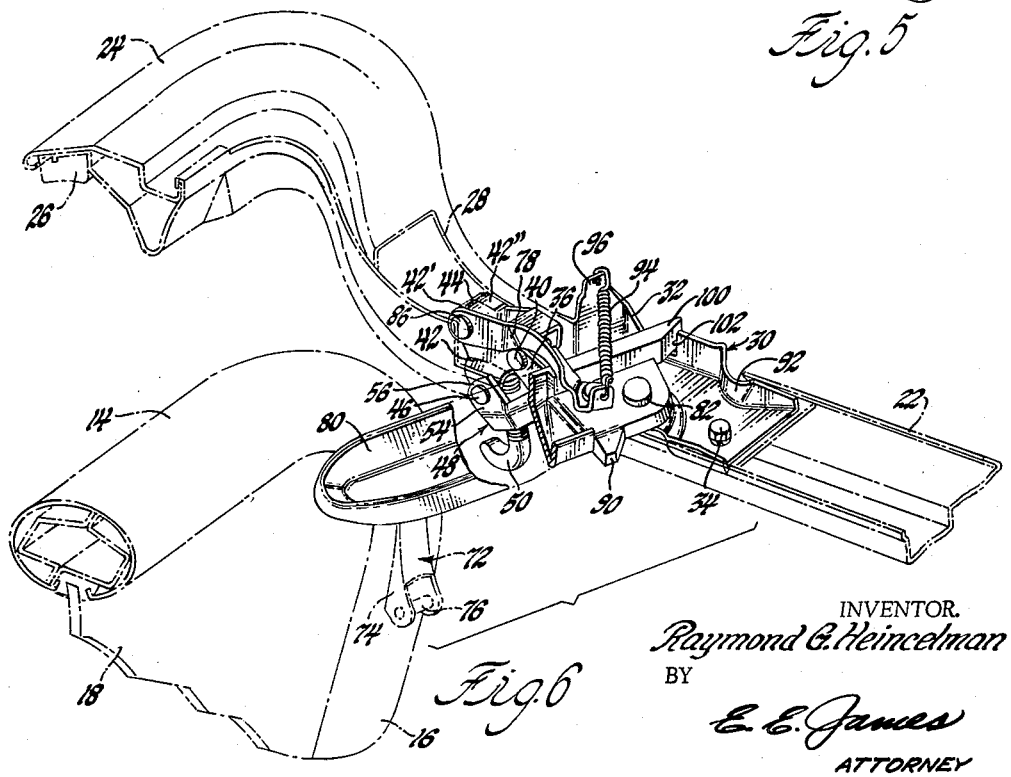

FIGURE 5 is a perspective view showing the several elements of the illustrative latch mechanism in their latched positions with associated vehicle body and convertible top members being shown in phantom lines; and FIGURE 6 is a perspective view similar to FIGURE 5 but showing the latch mechanism with the several elements in their latch disengaged positions with the associated body and top members in phantom lines being shown in slightly spaced relation as during opening or closing of the top structure relative to the windshield mounting header.

Figure 1:
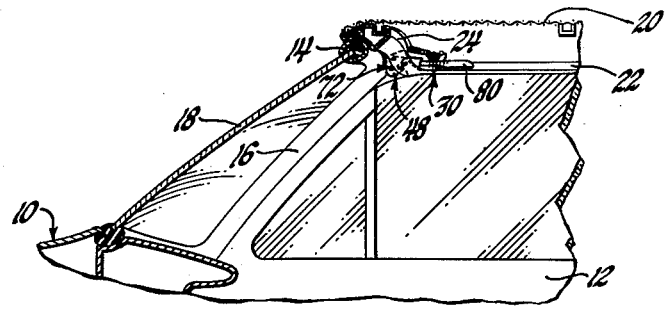
FIGURE 1 is a fragmentary sectional view of a portion of a convertible automotive vehicle body and shows the operational environment of the illustrative latch mechanism.

Referring more particularly to FIGURE 1, the convertible automotive vehicle body portion shown is indicated generally by reference numeral 10 and sectioned to show a front portion of the passenger compartment 12. A header 14 extends laterally of the vehicle body and cooperates with two pillars 16, only one being shown, to mount a windshield 18 in a conventional manner. A fabric top 20 is supported by an extensible frame including two side rail members 22, only one being shown, and a front rail header 24 and is movable therewith between a retracted top-opened position and an extended position closing the passenger compartment of the vehicle. The front rail 24 of the top supporting frame is bowed transversely of the vehicle and mates substantially with the windshield supporting header 14 when in its top-closed position shown in FIGURES 1 and 5. This bowed front rail portion mounts a resilient weatherstrip 26 which is sealingly and compressively engageable with the windshield supporting header by locking operation of the top latching mechanisms of the invention.

As shown in FIGURES 1, 5 and 6, the ends of the front rail 24 are curved downwardly and rearwardly and suitably joined to side rails 22 of upwardly opening channeled section. These front rail end portions are preferably perforated as indicated in broken lines at 28 in FIGURES 5 and 6. In accordance with the broader aspects of the invention, a latch bolt member of a side rail mounted latch mechanism 30 extends through each opening 28 and is movable between a top locking position in latching engagement with a striker on the adjacent windshield pillar and a retracted striker disengaging position. In the illustrative embodiment, each latch mechanism 30 is mounted substantially within the channel of its respective side rail member at its juncture with the front rail member. The two latch mechanisms 30 are thus laterally spaced and located immediately adjacent and slightly rearwardly of the rail openings 28.

In the accompanying drawings, only the latch mechanism on the right-hand side of the vehicle is shown and the following description is specifically related thereto. It will be apparent, however, that a similar latch mechanism of opposite hand is mountable within the left-hand side rail. Hence, the following description is equally applicable to the reversed configuration of the left-hand latch mechanism.

Each latch mechanism 30 includes a mounting bracket 32 of stamped configuration suitably secured at 34 within the channeled juncture of the side and front rail members. The forward end of the bracket 32 has spaced clevis arms 36 and 38 extending above the adjacent end of the rail opening 28. A pin 40 is secured to and extends between these clevis arms. This pin pivotally mounts one corner of a triangularly shaped bell crank lever 42 for swinging movement between a top locking, latch engaging position shown in full lines in FIGURES 2 and 5 and a latch disengaging position respectively shown in broken and full lines in FIGURES 2 and 6. The evler 42 is preferably mounted as shown from a suitable stamping having end portions 42′ and 42″ folded into mating engagement at 44. The substantially hollow lever thus formed has a bottom opening best seen in FIGURE 2. This opening is intersected at one end by the lever mounting pivot pin 40. A second pin 46 is journaled in the corner of the lever 42 adjacent the opposite end of its bottom opening and provides a lever arm with respect to pin 40. The pin 46 pivotally mounts a two-piece latch bolt lever 48.

The two-piece bolt lever 48 includes a hook-shaped bolt 50 which is threadably adjustable in a clevis member 54 having spaced arms 56 and 58 secured to and pivotal with the projecting ends of pivot pin 46. A helical spring 60 embraces pin 46 within the hollow recess of lever 42 and is torsionally interposed at 62 and 64, respectively, between the closed underside of lever 42 and a limit boss 66 formed on the bolt supporting member 54. The spring 60 thus normally biases the latch lever 48 towards an extended position, shown in broken lines at "A" and "B" in FIGURE 2, wherein the limit boss 66 on the bolt supporting member 54 engages the adjacent closed upper end of the bell crank lever 42.

The clevis arm 58 of the bolt supporting member 54 has a cam extension 68 engageable with a flange 70 projecting from the clevis arm 38 of the latch mounting bracket member 32. During downward swinging movement of the bolt mounting bell crank lever 42 toward its extreme latch disengaging position shown in FIGURES 2 and 6, the cam 68 initially engages the bracket flange 70 when the extended bolt lever 48 reaches position "B" in FIGURE 2. With further disengaging movement of the bell crank lever, the cam engaging flange 70 rotates the bolt lever 48 relative to the bell crank lever 42 to a spring opposed retracted position shown in broken lines at "C" in FIGURE 2. In this retracted position, the bolt 50 is removed from potential engagement with the adjacent pillar mounted striker during opening and closing movement of the top supporting frame members.

Figure 2:
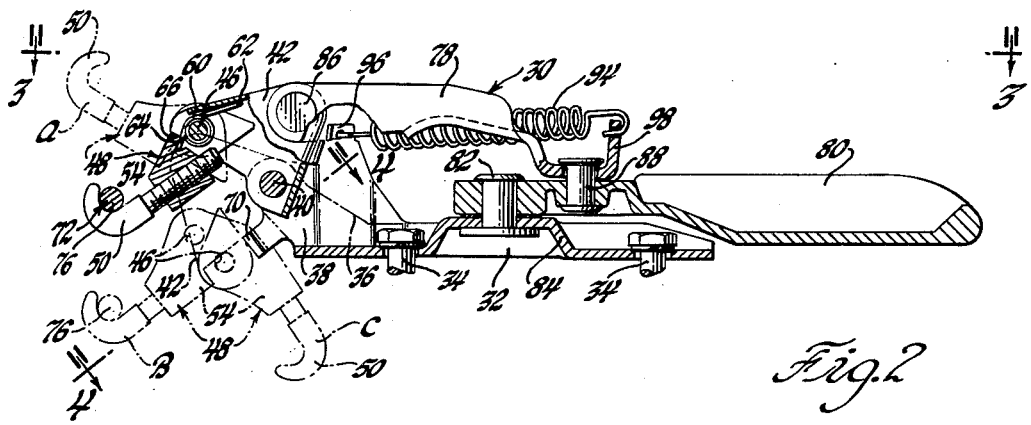
FIGURE 2 is a sectional view of the latch mechanism of the invention taken substantially in the plane indicated at 2—2 of FIGURE 3 and shows the keeper engaging latch member in several alternative operational positions.

During upward swinging of the bell crank lever 42 following closing movement of the front rail member proximate the front windshield member, relative movement between cam 68 and flange 70 permits spring 60 to rotate the bolt lever 48 from its extreme retracted position "C" toward its extended position shown at "B" in FIGURE 2. In approaching this extended lever position, the hook-shaped bolt 50 is conditioned to latchably engage a keeper or striker 72 on the adjacent windshield pillar. This striker may be formed integrally of the pillar. In the illustrative embodiment, however, the striker 72 includes a pillar mounted bracket 74 which supports a striker pin 76 extending laterally of and spaced from the pillar. Prior to initial striker engagement, the bolt 50 may slidable engage the pillar and thus rotatably cam the bolt lever 48 against the biasing action of spring 60 until it engages the striker pin. Further striker engaged upward movement of the bolt 50 is effected by swinging of the bell crank lever 42 to its extreme top locking position shown in full line in FIGURES 2 and 5, and exerts a clamping force sufficient to compressively seal the weatherstrip 26 between the windshield header 14 and the front rail 24 under all normal vehicle operative conditions.

Figure 3:
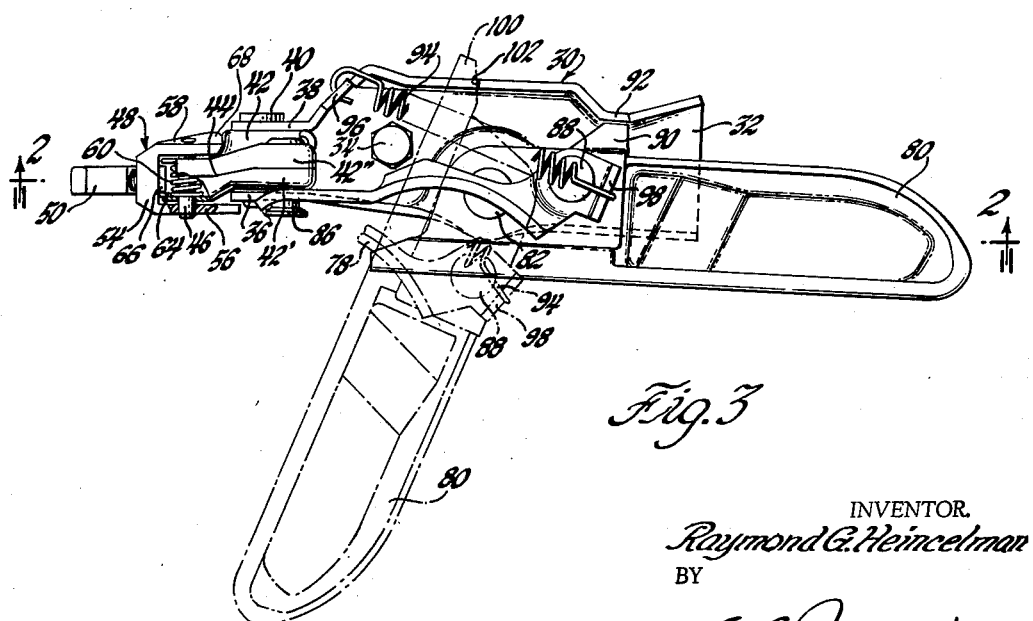
FIGURE 3 is a plan elevational view taken generally in the direction indicated at 3—3 of FIGURE 2, with a portion thereof broken away and sectioned to show the spring biased pivotal mounting of the keeper engaging latch member, and shows the retracted latch engaging and the extended latch disengaging positions of the operating lever.
Figure 4:
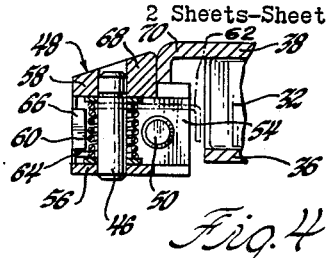
FIGURE 4 is a fragmentary sectional view of the spring biased pivotal mounting of the keeper engaging latch member and is taken substantially in the direction of the arrows and in the plane of the line indicated at 4—4 of FIGURE 2.

In the illustrative latch mechanism, a link 78 operably connects the bell crank lever 42 for swinging actuation by an operating lever 80. A headed stud 82 is journaled in a boss 84 upset intermediate the ends of bracket 32 and mounts the lever 80 for horizontal swinging movement between latch engaging and disengaging positions. As shown in full lines in FIGURES 1–3 and 5, the operating lever 80 is retracted substantially within the confines of the bracket 32 and its mounting side rail when in its latch engaging position. Upon actuation to its latch disengaging position shown in broken lines in FIGURE 3 and in full but broken away lines in FIGURE 6, the operating lever extends transversely of the side rail with a handle portion projecting inwardly of the passenger compartment. To translate horizontal swinging movement of the operating lever 80 between its latch engaging and disengaging positions into corresponding vertical swinging movement of the bell crank lever 42, the opposite ends of the link 78 are angled or bent normal to each other. These angled ends are loosely pivoted on studs or pins 86 and 88 which project as shown from the upper corner lever arm of the bell crank lever 42 and from the operating lever 80 in spaced parallel relation to is mounting stud 82. The axial and radial clearances provided between the link 78 and the pivot studs 86 and 88 are sufficient to permit limited universal movement therebetween.

The pivot stud 88 connecting the link 78 to the operating lever 80 is so located in its mounting on the operating lever that the line of action of the link passes overcenter of the lever mounting stud 82 upon manual actuation of the operating lever to its latch engaging position shown in full lines in FIGURES 1–3 and 5. In this position of the operating lever, the required top sealing and locking forces acting between windshield header 14 and the resilient weatherstrip of the top front rail 24 are maintained by the engaged latch bolt and striker. The top locking force applied to the bolt lever 48 is transmitted to the bell crank lever 42 and acts through the link 78 and pivot stud 88 to bias and maintain the operating lever 80 in its retracted latch engaging position wherein a limit boss 90 on the operating lever engages an upstanding flange 92 formed on the bracket 32.

As shown in the illustrative latch mechanism, a spring 94 is tensively interposed between an upstanding flange 96 formed forward of the bracket 32 and an upstanding flange 98 formed on the end of the link 78 pivotally connected to the operating lever. The spring seating bracket flange 96 is so located that the line of action of the spring 94 passes overcenter of the operating lever mounting pivot stud 82 during movement of the operating lever effecting initial bolt striker engagement and thereafter acts through a progressively increasing effective moment arm to assist operator effort in providing the top sealing and locking forces necessarily required between the windshield header and the front rail of the top structure. The spring 94 further cooperates with the overcenter biasing action of the link 78 to maintain the operating lever and the several elements of the latch mechanism in their extreme latch engaging, top locking positions.

During actuation of the operating lever in a clockwise direction toward its extreme latch disengaging position, the spring 94 is carried overcenter of the pivotal mounting stud of the operating lever and thereafter serves to bias the operating lever to its extreme latch disengaging position wherein a limit boss 100 on the operating lever engages the edge 102 of a limit flange formed on the bracket 32. Such spring biased movement of the operating lever is transmitted through the link 78 and effects downwardly swinging movement of the bell crank lever 42 to its extreme lower position wherein the bolt lever 48 is fully retracted by cooperative engagement between the cam 68 and the bracket flange 70.

From the foregoing description, it will be seen that the illustrative embodiment provides a relatively simple, easily operated convertible top header latch mountable substantially within the confines of each side rail frame member and fully capable of providing the several other stated advantages and objectives of the invention. It will be further apparent that various modifications, changes and departures might be made in and from the disclosed embodiment without departing from the spirit and scope of the invention as defined in the following claims.

I claim:

1. In a convertible vehicle body, the combination comprising, a top movable between extended and retracted positions relative to a stationary body member and including a side rail, keeper means on said stationary body member, latch means mounted on said top for movement between an unlatched position and a latched position in engagement with said keeper means to draw and latch together said body member and said top, and operating means movably mounted on said side rail and operable to move said latch means between said positions thereof upon movement between latch engaging and latch disengaging positions, said operating means in the latch engaging position thereof being nested substantially within said side rail and in the latch disengaging position thereof extending substantially into the passenger compartment for ready manipulation under minimum force.

2. In a convertible vehicle body, the combination comprising, a top movable between extended and retracted positions relative to a stationary body member and including a side rail, keeper means on said stationary body member, latch means mounted on said top for movement between an unlatched position and a latched position in engagement with said keeper means to draw and latch together said body member and said top, an elongated operating lever movably mounted on said side rail, and means operatively connecting said lever and said latch means to move said latch means between said positions thereof upon movement of said lever between latch engaging and latch disengaging positions, said lever in the latch engaging position thereof being nested substantially within said side rail and in the latch disengaging position thereof extending substantially into the passenger compartment for ready manipulation under minimum force.

3. In a convertible vehicle body, the combination comprising, a top movable between extended and retracted positions relative to a stationary body member and including a side rail, keeper means on said stationary body member, latch means mounted on said side rail for movement in a generally vertical plane between an unlatched position and a latched position in engagement with said keeper means to draw and latch together said body member and said top, an elongated operating lever mounted on said side rail for movement in a generally horizontal plane, and means operatively connecting said lever and said latch means to move said latch means between said positions thereof upon movement of said lever between latch engaging and latch disengaging positions, said lever in the latch engaging position thereof being nested substantially within said side rail and in the latch disengaging position thereof extending substantially into the passenger compartment for ready manipulation under minimum force.

4. In a convertible vehicle body, the combination comprising, a top movable between extended and retracted positions relative to a stationary body member and including a front rail member joined to a generally channel-shaped side rail member, keeper means on said stationary body member, bracket means mounted within said side rail adjacent the juncture thereof with said front rail, a latch bolt pivotally mounted on said bracket means for movement in a generally vertical plane between an unlatched position and a latched position in engagement with said keeper means to draw and latch together said stationary body member and said top, an elongated operating lever pivotally mounted on said bracket means at a point spaced from the pivot of said latch bolt and for movement in a generally horizontal plane, and means operatively connecting said lever and said latch bolt to move said latch bolt between said positions thereof upon movement of said lever between latch engaging and latch disengaging positions, said connecting means providing for overcenter movement of said lever between said positions thereof with respect to a line of action between the pivots of said latch bolt and said lever on said bracket means, said lever in the latch engaging position thereof being nested substantially within said side rail and in the latch disengaging position thereof extending substantially into the passenger compartment for ready manipulation under minimum force.

5. The combination recited in claim 4, wherein said connecting means includes a connecting lever having universal pivotal connections at opposite ends thereof with said latch bolt and said operating lever, and biasing means operative overcenter to selectively and alternately bias said operating lever to the latch engaging or the latch disengaging position thereof.

6. A latch mechanism for locking a convertible top in a closed position with respect to a passenger compartment of an automotive vehicle body, said body having two laterally spaced pillars and a transverse header supporting a front windshield and said top having a frame including two side rails and a transverse front rail movable into proximate sealing engagement with the windshield supporting header, said latch mechanism including keeper means mounted on one of the pillars, a bracket mounted on the side rail movable toward the keeper mounting pillar, a first lever pivotally mounted on the bracket for swinging movement between latch engaging and disengaging positions, a second lever pivotally mounted on said first lever and having latch means on the free end thereof swingable into latching engagement with said keeper means, spring means normally biasing said second lever for swinging movement with said first lever toward said keeper means and permitting limited swinging movement of said second lever in the opposite direction upon engagement with said one pillar prior to latching engagement with said keeper means, and cooperating means on said bracket and second lever engageable to swing said second lever in said opposite direction to a keeper disengaging retracted position in opposition to the biasing action of said spring means during movement of the first lever toward its latch disengaging position.

7. In a latch mechanism as set forth in claim 6, a third operating lever pivotally mounted on said bracket for swinging movement between latch engaging and disengaging positions about an axis spaced normally of the pivotal mounting axis of the first lever, an operating link pivotally connected at opposite ends to the first and third levers for limited universal swinging movement about pivotal axes spaced substantially parallel to their respective pivotal mounting axes and operable to effect swinging movement of said first lever between its latch engaging and disengaging positions in accordance with movement of said third lever through its operating range, the pivotal connection between said latch operating link and third lever being so located as to cause the line of action through said link to pass overcenter of the pivotal mounting axis of the third lever during movement to its latch engaging position whereby the latch engaging forces acting between said front rail and header tend to maintain said third lever in such position, and a second spring means operably connected to pass overcenter and resiliently bias said third lever toward either of its extreme positions.

8. In a latch mechanism as set forth in claim 6, a third operating lever pivotally mounted on said bracket for swinging movement between latch engaging and disengaging positions, and a link pivotally connected to the first and third levers and operable to transmit movement of said third lever between its latch engaging and disengaging positions to said first lever, the pivotal connections between said link and said first and third levers being so located as to cause the line of action through said link to pass overcenter of the pivotal mounting axis of the third lever during movement to its latch engaging position whereby the latch engaging forces acting between said front rail and header act to maintain said third lever in such latch engaging position.

9. A latch mechanism for locking a convertible top in a closed position with respect to a passenger compartment of an automotive vehicle body, said body having two laterally spaced pillars and a transversely extending header supporting a front windshield and said top having a frame including two side rails and a transverse front rail movable into proximate sealing engagement with the windshield supporting header, said latch mechanism including keeper means mounted on one of said pillars, a bracket mounted on the side rail movable toward said one pillar, a first lever pivotally mounted on said bracket for swinging movement between latch engaging and disengaging positions, a second lever pivotally mounted on said first lever and having latch means on the free end thereof swingable into latching engagement with said keeper means, spring means normally biasing said second lever for swinging movement with said first lever toward latching engagement with said keeper means and permitting limited swinging movement of said second lever in the opposite direction upon engagement with said one pillar prior to latching engagement with said keeper means, a third operating lever pivotally mounted on said bracket for swinging movement between latch engaging and disengaging positions, and a link pivotally connected to the first and third levers and operable to transmit swinging movement of said third lever between its latch engaging and disengaging positions to said first lever, the line of action through said link passing overcenter of the pivotal mounting axis of the third lever during movement to its latch engaging position whereby the latch engaging forces effected between said front rail and header act to maintain said third lever in its latch engaged position.

10. In a latch mechanism as set forth in claim 9, a second spring means acting between said one member and said operating link to bias said third lever toward its latch engaging position, and the line of action of said second spring means being adapted to pass overcenter of the pivotal axis of said third lever during movement to its latch disengaged position whereby said second spring means tends to maintain said third lever in either of its extreme positions.

11. A latch mechanism for locking a convertible top in a closed position with respect to a passenger compartment in an automotive vehicle body, said top having a frame including two side rails interconnected by a transverse front rail movable into proximate sealing engagement with a windshield supporting body member, said latch mechanism comprising keeper means on at least one end of said windshield supporting member, a first lever pivotally mounted on the side rail movable toward said keeper means and swingable between latch engaging and disengaging positions, a second lever pivotally mounted on said first lever and having latch means on the free end thereof engageable with said keeper means, spring means normally biasing said second lever for swinging movement with said first lever toward said keeper means and permitting limited opposite swinging thereof relative to said first lever upon engagement with said windshield supporting member prior to latching engagement with the keeper means, and cooperating cam means operable to swing said second lever in said opposite direction away from keeper latching engagement in opposition to the biasing action of said spring means upon swinging movement of the first lever toward its latch disengaging position.

12. In a convertible automotive vehicle having a top supporting frame including side rails interconnected by a front rail movable into engagement with a windshield supporting member to close a vehicle passenger compartment, a latch mechanism including keeper means mounted on said windshield supporting member opposite at least one of said side rails, a first lever pivotally mounted on said one side rail for swinging movement between latch engaging and disengaging positions, a second lever pivotally mounted on said first lever and swingable thereby to and from a retracted keeper disengaging position and latching engagement with said keeper means, and spring means normally biasing said second lever for swinging movement with the first lever toward said keeper means and permitting limited swinging of said second lever in an opposite direction with respect to the first lever upon engagement with said windshield supporting member prior to being carried into latching engagement with said keeper means by further movement of the first lever to its latch engaging position.

13. In a latch mechanism as set forth in claim 12, cam means operable by swinging of the first lever toward its latch disengaging position to swing the second lever in said opposite direction to its keeper disengaging retracted position in opposition to the biasing action of said spring means.

14. In a latch mechanism as set forth in claim 12, a third operating lever pivotally mounted on said one side rail for swinging movement between latch engaging and disengaging positions, and an operating link pivotally connected at opposite ends to the first and third lever and operable to effect swinging movement of said first lever between its latch engaging and disengaging positions in accordance with movement of the third lever through its operating range.

15. In a latch mechanism as set forth in claim 14, the pivotal connections between said latch operating link and said first and third levers being so located as to cause the line of action through said link to pass overcenter of the pivotal mounting axis of the third lever during movement to its latch engaging position whereby the forces acting between latch engaged front rail and windshield supporting members act to maintain the third lever in its extreme latch engaged position.

References Cited by the Examiner

UNITED STATES PATENTS

| 1,321,914 | 11/19 | Hedges | 296—116 |
| 1,489,465 | 8/24 | Spaugh. | |
| 2,886,364 | 5/59 | Smith | 292—113 |
| 2,924,475 | 2/60 | Russell | 292—129 |
| 3,019,043 | 1/62 | Woodworth | 292—113 |
| 3,129,025 | 4/64 | Krueger | 292—113 |

FOREIGN PATENTS 1,022,118  1/58  Germany.

M. HENSON WOOD, JR., *Primary Examiner.*
THOMAS J. HICKEY, *Examiner.*

UNITED STATES PATENT OFFICE
CERTIFICATE OF CORRECTION

Patent No. 3,216,763                          November 9, 1965

Raymond G. Heincelman

It is hereby certified that error appears in the above numbered patent requiring correction and that the said Letters Patent should read as corrected below.

Column 3, line 25, for "evler" read -- lever --; same line 25, for "mounted" read -- formed --; column 4, line 4, for "slidable" read -- slidably --; column 8, line 63, for "8/24" read -- 4/24 --.

Signed and sealed this 6th day of September 1966.

(SEAL)
Attest:

ERNEST W. SWIDER
Attesting Officer

EDWARD J. BRENNE
Commissioner of Patent